United States Patent [19]

Soler

[11] 3,899,608

[45] Aug. 12, 1975

[54] METHOD FOR CHEMICALLY PEELING FRUITS AND VEGETABLES

[75] Inventor: Salvador Forroll Soler, San Cugat Del Valles, Spain

[73] Assignee: Establissements du Paroy, Gentilly, France

[22] Filed: Aug. 16, 1973

[21] Appl. No.: 388,981

[30] Foreign Application Priority Data
Aug. 19, 1972 Spain .................................. 406358

[52] U.S. Cl. ................................ 426/287; 426/482
[51] Int. Cl.² .......................................... A23L 1/212
[58] Field of Search ...... 252/60, 523, 539; 426/287, 426/382, 381, 478, 479, 482, 287, 481

[56] References Cited
UNITED STATES PATENTS

| | | | |
|---|---|---|---|
| 1,453,781 | 5/1923 | Ash..................................... | 426/287 |
| 1,584,022 | 5/1926 | Englund............................ | 252/523 |
| 2,108,563 | 11/1934 | Mnvokin............................. | 426/286 |
| 2,108,763 | 2/1934 | Carswell ............................ | 426/286 |
| 2,233,447 | 1/1940 | Dolman ............................ | 426/286 |
| 2,731,422 | 1/1956 | Ramsey............................. | 252/523 |
| 3,354,092 | 11/1967 | Perry .................................. | 426/523 |
| 3,513,099 | 5/1970 | Hans.................................. | 252/523 |
| 3,796,817 | 3/1974 | Aepli ................................. | 426/287 |

FOREIGN PATENTS OR APPLICATIONS
563,255 9/1958 Canada.............................. 252/523

OTHER PUBLICATIONS
The Condensed Chemical Dictionary, Hawley Van Nostrand Reinhold Co., 1971, p. 188.

*Primary Examiner*—Samih N. Zaharna
*Assistant Examiner*—Ernest G. Therkorn
*Attorney, Agent, or Firm*—Amster & Rothstein

[57] ABSTRACT

Fruits and vegetables are treated by dipping during 1 to 30 minutes in a composition kept at a temperature of 60° to 100°C, said composition being an aqueous solution comprising at least one ammonium salt of an inorganic acid, selected among the ammonium salts giving in a 5% by weight aqueous solution at 20°C a pH of 7 to 9.5, preferably among the ammonium salts of orthophosphoric acid, the mixed salts of ammonium and of an alkali metal base of orthophosphoric acid, ammonium carbonate and mixtures of these ammonium salts, the ammonium salt concentration in the aqueous solution being advantageously of 0.5 to 15% by weight and the aqueous solution comprising if desired a surface active agent. The physical and organoleptic properties of the fruits and vegetables are not impaired.

8 Claims, No Drawings

METHOD FOR CHEMICALLY PEELING FRUITS AND VEGETABLES

BACKGROUND OF THE INVENTION.

The present invention relates to a novel method for peeling fruits and vegetables by a chemical process. The results obtained with this method are far better than those given by hitherto known methods from the dual point of view of the yield in peeled fruits and vegetables and of the quality thereof.

In the treatment of fruits and vegetables preparatory to the tinning thereof the peeling operation is particularly important.

DESCRIPTION OF THE PRIOR ART.

Up to now the industrial peeling of fruits and vegetables for preparing preserved fodd was performed food to three procedures:
1. mechanically,
2. by using water steam, and
3. chemically, by using aqueous solutions of caustic soda.

The methods (1) and (2) hereinabove involve considerable investments and are conducive to relatively low yields of peeled fruits and vegetables; in addition, producing steam is in all cases expensive, and these methods are used only when the chemical one (3) is inoperative.

The third method, now the most popular throughout the world, consists in treating fruits and vegetables by dipping them in a caustic soda solution at a temperature usually within the range of 90° to 100°C, the concentration of this solution as well as the dipping or immersion time varying according to each specific case. In this technique, advantage is taken of the corrosive and destructive action of caustic soda on vegetable tissues; in fact, the skins or peels are destroyed together with one portion of the fruit or vegetable, thus reducing appreciably the efficiency and, in certain cases, altering the taste and colour. Moreover, the aggressiveness of caustic soda constitutes a permanent virtual danger for the personnel entrusted with handling operations. On the other hand, the skins and peels of the treated fruits and vegetables scatter in the caustic soda solution which becomes gradually loaded with sludge and skin fragments, so that its efficiency drops rapidly, thus making the peeling operation a rather expensive and uneconomical one as a consequence of the frequency of bath renewals, thus increasing rather heavily the cost of the final product.

SUMMARY OF THE INVENTION.

Quite unexpectedly, it was discovered that a composition consisting of an aqueous solution comprising at least one ammonium salt of an inorganic acid, selected more particularly among the ammonium salts giving in a 5% by weight aqueous solution at 20°C a pH of 7 to 9.5, had an astonishing peeling capacity. The ammonium salt is selected preferably from the group consisting of monoammonium orthophosphate, diammonium orthophosphate, triammonium orthophosphate, mixed salts of ammonium and of an alkali metal base of orthophosphoric acid, ammonium carbonate, and mixtures of these ammonium salts. The ammonium salt concentration of the composition advantageously ranges from 0.5 to 15% by weight.

Since ammonium salts are neither caustic nor corrosive, in contrast to caustic soda, they do not destroy the vegetable tissues but produce a "skinning" effect attended by the elimination of rootlets, so that all "eyes" and "black spots" are definitely removed.

After many tests performed with ammonium salts it was found that orthophosphates are preferable and that the ideal salt giving the maximum yield was diammonium orthophosphate alone (having a pH of about 8.2 in a 5% by weight aqueous solution concentration at 20°C) or in admixture with ammonium carbonate (having a pH of about 8 to 9 in a 5% by weight aqueous solution concentration at 20°C).

It was also found that ammonium salt could be partially neutralized by using a strong alkali metal base (caustic soda or caustic potash); the results are also satisfactory. In fact, it is only necessary that the ammonium salt delivers by hydrolysis a sufficient quantity of ammonium ions.

Weaker pH ammonium salts such as ammonium sulfate and ammonium acetate (having a pH of 6 to 7 in a 5% by weight aqueous solution concentration at 20°C) already have a mean peeling capacity.

The ammonium salts of orthophosphoric acid are unique in that this acid has three acidities of different strength so that according to the degree of neutralization the optimum pH value and therefore the optimum ammonium ion concentration can be obtained for each specific case.

This invention is also concerned with a method for chemically peeling fruits and vegetables, characterized in that the fruits and vegetables are treated by dipping during 1 to 30 minutes and preferably from 3 to 10 minutes in a composition of the type set forth hereinabove, kept at a temperature within the range of 60° to 100°C and preferably from 80° to 95°C. The operation is performed by using the same apparatus as in the case of conventional caustic soda treatments.

When operating on a commercial scale, the apparatus being open to the free atmosphere, after a certain time of operation a decrease in the pH value is observed which is due partially to a slight washing away of ammonium hydroxide by the evaporating water, this reduction corresponding to the conversion of a certain amount of diammonium phosphate into monoammonium phosphate. When the pH value approaches 7, it may be necessary to restore diammonium phosphate by adding ammonium hydroxide or a strong alkali (caustic soda or caustic potash) the latter shifting the ammonium from a strong acidity of the phosphoric acid to a low acidity, thus permitting the production of ammonium ions.

A convenient means for retarding to a large extent the washing away of ammonium hydroxide by the evaporating water consists in building up an oil surface layer.

Of course, when operating under closed-vessel conditions, this ammonium hydroxide entrainment is not observed.

The efficiency of the composition used in this invention may be improved to a certain extent by adding surface active substances to the ammonium salt solution with a view to improve the wetting properties of the composition and thus activate its penetration. To this end particularly efficient substances are: alkyl-benzenesulfonates (preferably ammonium alkyl-benzenesulfonates) comprising 1 to 8 carbon atoms in the alkyl group, as well as alkylsulfonates having the formula $RSO_3Me$ wherein R is a hydrocarbon radical containing 10 to 18 carbon atoms and Me the ammonium ion or an alkali metal, and also alkyl-sulfates having the formula $ROSO_3Me$ wherein R is a straight-chain or branched-chain hydrocarbon radical having 6 to 10 carbon atoms. The proportion of these surface-active substances is preferably in the range of 0.02 to 0.2% by weight.

The chemical treatment method according to this invention is free of the above-mentioned inconveniences characterizing prior art methods and provides considerably higher yields than those obtained with said prior art caustic soda methods. The fruits and vegetables treated by the method of this invention are in perfect physical condition (the natural colour, the original size and the structure of the original surface are preserved, the appearance is smooth, free of craters), their colours not not change with time and their organoleptic properties remain unchanged.

It may also be pointed out that the composition used in this invention is characterized by a high detergent capacity so that perfectly clean fruits and vegetables can be obtained after rinsing them with water.

The method of this invention is particularly suited for peeling root-vegetables such as salsifies, carrots, turnips, beetroots, and fruits such as tomatoes and peaches.

For carrying out the peeling method of this invention, a concentrated solution containing the above-mentioned component elements at a multiple concentration with respect to the actual service concentration, so that the solution is diluted with water just before use, in the proper proportions, may be used.

DESCRIPTION OF THE PREFERRED EMBODIMENT.

A few comparative examples affording a clearer understanding of the advantages obtainable by applying the method of this invention will now be described. All percentages are by weight. In all cases, a surface active substance is added in the above-defined proportions.

EXAMPLE 1

Removal of peach peels.

|  | With caustic soda | with diammonium phosphate |
|---|---|---|
| Bath concentration | 20% | 4% |
| pH at 20°C | 14 | 8.2 |
| Operating temperature | 93°C ± 2 | 93°C ± 2 |
| Treatment time | 1 minute | 1 minute |
| Peeled product percentage | 70 to 75% | 85 to 90% |

It is clear that the reagent ratio by weight being 1 to 5, all other conditions being equal, the yield is improved by about 20% with a substantial saving of reagent.

EXAMPLE 2

Removal of potato peels

In this case, 15% caustic soda solutions having a pH value of 14 and an aqueous ammonium salt composition containing 6% of diammonium phosphate and 2% of ammonium carbonate (pH = 8.5 at 20°C) were used.

The treatment time was in both cases 6 mn, the operating temperatures of 95 and 80°C, respectively. The following yields have been recorded:

| Caustic soda treatment | 60 to 65% |
|---|---|
| Diammonium phosphate treatment | 75 to 80% |

Thus, with a lower reagent concentration and a lower temperature, the peeling yield was increased by about 20%.

EXAMPLE 3

Removal of salsify peels.

|  | With caustic soda | With diammonium phosphate |
|---|---|---|
| Bath concentration | 10% | 4% |
| pH at 20°C | 14 | 8.2 |
| Operating temperature | 93°C ± 2 | 93°C ± 2 |
| Treatment time | 8 minutes | 8 minutes |
| Peeled product percentage | 45 to 50% | 65 to 70% |

In this case, with a substantially equivalent reagent expense and by maintaining, on the other hand, equal operating conditions, the yield is increased by about 40%, thus confirming, in general, that the greater the specific surface of the vegetable, the greater the yield increment.

EXAMPLE 4

Removal of peels from small-gage carrots (16 to 18mm)

|  | With caustic soda | With diammonium phosphate |
|---|---|---|
| Bath concentration | 7 % | 1.75% |
| pH at 20°C | 14 | 8.1 |
| Operating temperature | 93°C ± 2 | 93°C ± 2 |
| Treatment time | 4 to 5 minutes | 4 to 5 minutes |
| Peeled product percentage | 50% | 80% |

With diammonium phosphate, the yield was increased by 60%.

EXAMPLE 5

Removal of turnip peels.

|  | With caustic soda | With diammonium phosphate |
|---|---|---|
| Bath concentration | 10% | 3% |
| pH at 20°C | 14 | 8.2 |
| Operating temperature | 93°C ± 2 | 93°C ± 2 |
| Treatment time | 8 to 9 min. | 8 to 9 min. |
| Peeled product percentage | 60% | 80% |

With diammonium phosphate the yield was increased by 33%.

As can be seen from the above examples, the advantages deriving from the application of the method of this invention are particularly interesting and valuable. These advantages may be summarized as follows:

a. Firstly, only a non-corrosive action is exerted on the fruit or vegetable proper, since the only effect obtained is the removal of the peel or skin, so that the yield of peeled fruits or vegetables is increased while leaving unaltered all the natural properties thereof.

b. The baths do not become loaded with sludge or organical matter deposits, since the peels or skins are not dissolved but simply removed, so that the baths can be regenerated very easily by sifting and require a complete replacement only after long periods of treatment, thus affording substantial savings in reagents and making the peeling operations much more advantageous from the point of view of economy.

c. On the other hand, neither the shape nor the colour, nor the organoleptic properties of the treated fruits and vegetables are altered, so that the fruits and vegetables have a far better appearance.

d. The elimination of both residues, through the washing of fruits and vegetables, is much simpler than when using caustic soda, which is difficult to remove and requires repeated, intense washing steps.

e. Since diammonium phosphate is an easily dissolvable substance already employed for other purposes in the food industry, on the one hand it can be eliminated completely and, on the other hand, any residue likely to be left in the fruits and vegetables is definitely innocuous and free of any risk for human health.

What I claim is:

1. A method of chemically removing the skins of fruits and vegetables, which comprises dipping the fruits and vegetables for a period of 1 to 30 minutes in a composition kept at a temperature within the range of 60° to 100°C., said composition being an aqueous solution comprising 0.5 to 15% by weight of an ammonium salt of an inorganic acid having a pH value of 7 to 9.5 at 20°C. selected from the group consisting of monoammonium orthophosphate, diammonium orthophosphate, triammonium orthophosphate, mixed salts of ammonium and of an alkali metal base of orthophosphoric acid, ammonium carbonate, and mixtures of these ammonium salts.

2. A method according to claim 1, wherein said aqueous solution includes a surface active agent selected from the group consisting of ammonium alkyl benzenesulfonates with 1 to 8 carbon atoms in the alkyl group, alkylsulfonates of formula $R SO_3 Me$ wherein R is a hydrocarbon radical with 10 to 18 carbon atoms and Me is ammonium or alkali metal, and alkyl sulfates of formula $RO SO_3 Me$, wherein R is a straight-chain or branched-chain hydrocarbon radical with 6 to 10 carbon atoms and Me is ammonium or alkali metal.

3. A method according to claim 1, wherein the fruits and vegetables are dipped for a period of 3 to 10 minutes and said composition is kept at a temperature within the range of 80° to 95°C.

4. A method according to claim 1, wherein said aqueous solution results from dilution with water of a concentrated aqueous stock solution.

5. A method according to claim 1, wherein said ammonium salt consists of diammonium orthophosphate.

6. A method according to claim 5, wherein said composition comprises 1 to 5% by weight of diammonium orthophosphate and has a pH of 8.1 to 8.2 at 20°C.

7. A method according to claim 1, wherein said ammonium salt consists of a mixture of diammonium orthophosphate and ammonium carbonate.

8. A method according to claim 7, wherein said composition comprises 6% by weight of diammonium orthophosphate, 2% by weight of ammonium carbonate, and has a pH of 8.5 at 20°C.

* * * * *

UNITED STATES PATENT AND TRADEMARK OFFICE
CERTIFICATE OF CORRECTION

PATENT NO. : 3,899,608
DATED : August 12, 1975
INVENTOR(S) : Salvador Forroll Soler It is certified that error appears in the above-identified patent and that said Letters Patent are hereby corrected as shown below:

Column 1, line 17: replace "fodd was performed food" by --food was performed according--;

Column 5, line 16: replace "both" by --bath--.

Signed and Sealed this tenth Day of February 1976

[SEAL]

Attest:

RUTH C. MASON
*Attesting Officer*

C. MARSHALL DANN
*Commissioner of Patents and Trademarks*